United States Patent [19]

Pelrine

[11] 4,395,327

[45] Jul. 26, 1983

[54] HYDROTREATING PROCESS

[75] Inventor: Bruce P. Pelrine, Lawrenceville, N.J.

[73] Assignee: Mobil Oil Corporation, New York, N.Y.

[21] Appl. No.: 408,953

[22] Filed: Aug. 17, 1982

[51] Int. Cl.³ .............................................. C10G 45/12
[52] U.S. Cl. .......................... 208/216 R; 208/254 H; 208/251 H
[58] Field of Search ............... 208/216 R, 254 H, 111, 208/120, 217, 251 H

[56] References Cited

U.S. PATENT DOCUMENTS

| | | | |
|---|---|---|---|
| 4,211,635 | 7/1980 | Chen | 208/93 |
| 4,259,170 | 3/1981 | Graham et al. | 208/33 |
| 4,269,695 | 5/1981 | Silk et al. | 208/111 |
| 4,292,166 | 9/1981 | Gorring et al. | 208/59 |
| 4,357,233 | 11/1982 | Dwyer et al. | 208/109 |
| 4,358,363 | 11/1982 | Smith | 208/91 |

*Primary Examiner*—Delbert E. Gantz
*Assistant Examiner*—O. Chaudhuri
*Attorney, Agent, or Firm*—Charles A. Huggett; Charles J. Speciale; L. G. Wise

[57] ABSTRACT

Lubricating oils of improved quality are prepared by hydrotreating a lubricant base stock in the presence of a hydrotreating catalyst comprising zeolite ZSM-39 and a hydrogenation component.

6 Claims, No Drawings

HYDROTREATING PROCESS

FIELD OF THE INVENTION

This invention relates to a hydrotreating process, especially to a hydrotreating process for lubricating (lube) oil base stocks.

BACKGROUND OF THE INVENTION

High quality lube base stock oils are conveniently prepared by refining the residuum prepared by the vacuum distillation of a suitable crude oil from which the lighter portion has been removed by distillation in an atmospheric tower.

The vacuum distillate fractions are upgraded by a sequence of unit operations, the first of which is solvent extraction with a solvent which is selective for aromatic hydrocarbons. This step serves to remove aromatic hydrocarbons of low viscosity index and provides a raffinate of improved viscosity index and quality. Various processes have been used in this extraction stage, and these employ solvents such as furfural, phenol, sulfur dioxide, and others. The vacuum tower residuum, because it contains most of the asphaltenes of the crude oil, is conventionally treated to remove these asphalt-like constituents prior to solvent extraction to increase the viscosity index.

The raffinate from the solvent extraction step contains paraffins which adversely affect the pour point. Thus, the waxy raffinate, regardless of whether prepared from a distillate fraction or from the vacuum tower residuum, must be dewaxed. Various dewaxing procedures have been used such as solvent dewaxing with the aid of a solvent such as MEK/toluene, propane dewaxing or catalytic dewaxing, as described in the Oil and Gas Journal, Jan. 6, 1975, pages 69-73 and U.S. Pat. Nos. 3,668,113, 3,894,938, 4,137,148 and RE 28,398.

Various other processes have also been used to improve the qualities of lube oil and other base stocks, for example, by removing sulfur, nitrogen and oxygen compounds and by saturating aromatics to produce hydrocarbons with more desirable properties. One of the processes which has achieved widespread use in the petroluem refining industry for this purpose is hydrotreating or, as it is often referred to, hydrorefining or hydrofinishing. In hydrotreating, the feedstock which is to be treated is passed over a bifunctional catalyst which has both acidic and hydrogenation activity in the presence of hydrogen at elevated temperatures and pressures. Heterocyclic compounds containing sulfur, nitrogen and oxygen are subjected to ring opening and the impurities are converted to inorganic hydrogenated compounds which are removed as gases. Hydrogenation of unsaturated hydrocarbons also takes place, together with a mild degree of cracking. Removal of metals may also be accomplished by this treatment. Hydrotreating processes of various kinds are described, for example, in U.S. Pat. Nos. 4,137,148, 3,562,145, 3,853,749, 3,904,513, 3,985,643, 3,979,279 and 4,181,598.

The catalysts which have conventionally been used for hydrotreating processes have been large pore materials such as alumina, as described in U.S. Pat. Nos. 3,904,513 and 4,181,598, with a hydrogenation component such as nickel, cobalt or molybdenum deposited on it.

SUMMARY OF THE INVENTION

It has now been found that a catalyst based on zeolite ZSM-39, a dense phase zeolite, may be used with advantage in hydrotreating processes, especially in the hydrotreating of lube oil base stocks. The hydrotreated products are characterized by good color and pour point and are obtained in good yields. The oil which is to be treated is contacted with the catalyst in the presence of hydrogen under hydrotreating conditions of elevated temperature and pressure, e.g., temperatures of 200° to 600° C., pressures up to 25,000 kPa and space velocities of 0.1 to 20.

PREFERRED EMBODIMENTS OF THE INVENTION

Catalyst

The catalyst used in the present hydrotreating process is a bifunctional catalyst having both acidic functionality and hydrogenation-dehydrogenation functionality. The acidic functionality is provided by zeolite ZSM-39 which acts as a support for the hydrogenation-dehydrogenation component (which, for convenience, will be referred to as the hydrogenation component). Zeolite ZSM-39 is a known zeolite which is described in U.S. Pat. No. 4,287,166 to which reference is made for details of this zeolite, its preparation and utility and whose disclosure is incorporated in this specification by reference. An alternative method of preparing ZSM-39 is described in U.S. Pat. No. 4,259,306 to which reference is made for details of the method and whose disclosure is also incorporated by reference.

The zeolite acts as a support or carrier for the hydrogenation component which may be either a noble metal or a base metal. Suitable metals are selected from Group VIII of the Periodic Table, including the noble metals platinum, palladium, iridium, osmium, rhodium and ruthenium and non-noble metals such as iron, cobalt and nickel and also from Groups VIB and VIIB, including molybdenum, tungsten, and rhenium. (The periodic arrangement used in this specification is the IUPAC arrangement shown, for example, in the Periodic Table of the Sargent-Welch Scientific Company, Catalog No. S-18806). Combinations of metals such as nickel-cobalt, cobalt-molybdenum, nickel-tungsten, platinum-iridium, platinum-rhenium, platinum-iridium-rhenium are especially favored.

The metal component may be incorporated into the support by any suitable method such as impregnation or exchange onto the zeolite. The metal may be incorporated in the form of a cationic, anionic or neutral complex such as $Pt(NH_3)_4^{2+}$ and cationic complexes of this type will be found convenient for exchanging metals onto the zeolite. Anionic complexes such as the vanadate, molybdate or metatungstate ions are useful for impregnating metals into the zeolite support. Methods of this kind are well known and conventional.

The amount of the hydrogenation-dehydrogenation component is suitably from 0.01 to 10 percent by weight, normally 0.1 to 5 percent by weight, although this will, of course, vary with the nature of the component, less of the highly active noble metals being required that of the less active base metals.

If the metal component is present in the oxide form, as is commonly obtained by heating the complex ions such as vanadate or heptamolybdate, it may be converted to the more active sulfide form in the conventional manner by heating in the presence of hydrogen sulfide gas or an organic sulfur compound such as thiophere.

Feedstock

The feedstock for the process is a high boiling base stock such as a lube oil base stock and as such will normally have an initial boiling point of 345° C. (about 650° F.) and a final end point which is normally below 700° C. (about 1300° F.) and normally below 540° C. (1000° F.). More restricted boiling ranges may, of course, be encountered, e.g., 350° to 450° C. The lube oil base stocks may be produced by the dewaxing of high boiling point hydrocarbon fractions obtained by the fractional distillation of petroleum crudes. The crude may be either naphthenic or paraffinic in nature and even oils of asphaltic origin may be used albeit to less advantage. For oils of high viscosity index, paraffinic base crudes will be preferred although these oils will be generally of higher pour point than those of naphthenic origin. Other stocks such as those derived from shale oil or solvent refined coal liquids may also be treated by the present hydrotreating process.

The selected hydrocarbon fraction may be subjected to conventional processing steps to improve its qualities, e.g., dewaxing by solvent dewaxing, propane dewaxing or catalytic dewaxing, desulfurization, demetallation and solvent extraction, e.g., by a solvent such as furtural, phenol Chlorex (trademark for 2,2'-dichloroethyl ether), Selecto (trademark for a blend of phenol and cresol) or sulfur dioxide/benzol, which is selective for aromatics or other undesirable components. Preferred feedstocks for the present hydrotreating process are the solvent extracted neutral raffinates produced from dewaxed base stocks.

An example of a typical base stock is a dewaxed heavy neutral raffinate having the following distillation curve:

|      | °C. |
|------|-----|
| IBP  | 380 |
| 5%   | 453 |
| 10%  | 464 |
| 30%  | 478 |
| 50%  | 488 |
| 70%  | 499 |
| 90%  | 515 |
| 95%  | 520 |

The heteroatom content of the base stock will vary according to its origin and prior processing but normally the maximum sulfur content will not exceed 2.5 percent by weight and, in most cases, will not be greater than 1.5 percent by weight, e.g. 0.89 weight percent, especially for bright stock, with lower sulfur contents being encountered with feedstocks of lower end point. The nitrogen content will normally not exceed 70 to 80 ppm maximum. The removal of sulfur will normally exceed 90 percent and in many cases will exceed 99 percent; removal of nitrogen is normally at least 90 percent (both on a normalized basis, i.e. normalized to zero conversion).

Process Conditions

The feedstock which is to be hydrotreated is contacted with the catalyst in the presence of hydrogen under hydrotreating conditions of elevated temperature and pressure. Because it is desired to minimize the degree of cracking, relatively low temperature of 200° to 600° C. (about 390° to 1110° F.) will normally be employed, preferably 250° to 375° C. (about 480° to 705° F.). Total system pressures will normally be at least 3000 kPa (420 psig) and in most cases at least 7000 kPa (1000 psig) in order to favor the desired hydrogenation reactions. Maximum pressure will normally be set by the equipment and will normally not exceed 20,000 kPa (about 2885 psig) and, in most cases, 15,000 kPa (about 2160 psig). Hydrogen pressure will normally be at least 90 percent of the total system pressure and more usually at least 95 percent. Feedstock space velocity will normally be in the range of 0.1 to 20, more usually 0.5 to 5. Hydrogen circulation ratios of 200 to 1000 $n.l.l^{-1}$ (about 1125 to 5620 SCF/bbl), (hydrogen:hydrocarbon feedstock) will be typical and hydrogen consumption rates of 50 to 500 also.

Because the principal reaction taking place during the hydrotreating is hydrogenation, only a limited degree of acidity is desired for the catalyst. It has been found that ZSM-39 is very satisfactory for this purpose and it is, moreover, surprising that it should perform well in the present process because it has been the conventional wisdom and practice to use high surface large pore supports such as 100 A° alumina in hydrotreating processes. Zeolite ZSM-39, on the other hand, is a dense phase zeolite of low porosity and low surface area which nevertheless produces highly satisfactory results. The acidity of the zeolite is sufficient, however, to promote the ring opening reactions which enable heterocyclic atoms such as nitrogen and sulfur to be removed after hydrogenation of the ring structures containing them.

During the process, a limited degree of conversion to lower boiling products may take place, especially with lube stocks having a low initial boiling point, e.g. about 345° C. (about 650° F.) when the initial boiling point will be lowered slightly. Small decreases in the end point may also be noted but generally the degree of conversion will be quite small, with yields of at least 90 percent, usually about 98 to 100 percent, being obtained.

The hydrotreated lube oil product is obtained in good yield and is notable for its good color and low pour point.

The invention is illustrated by the following Examples in which all proportions, parts and percentages are by weight unless stated to the contrary.

EXAMPLE 1

Preparation of Catalyst

ZSM-39 (15 g) was added to a solution of cobalt nitrate $Co(No_3)_2.6H_2O$ (2.23 g) and ammonium heptamolybdate $(NH_4)_6Mo_7O_{24}.4H_2O$ dissolved in 10 ml water. An additional 10 ml water was then added while mixing with a magnetic stirrer. The slurry was heated gently while stirring, to remove excess water until dry.

The Co/Mo/ZSM-39 obtained in this was was placed in a muffle furnace and heated for 4 hours at 540° C. and then at 650° C. for 16 hours to form the oxides of the metals. Analysis showed 6.7% CoO and 12.6% $MoO_3$.

Conversion of the oxides to the more active sulfides was carried out by passing 4 vol. percent thiophene in dodecane at the rate of 20 ml hr.$^{-1}$ over 7.5 cc (5.7 g) of the heated 20/30 mesh (Tyler) catalyst. The contacting temperature was initially 205° C. which was raised to 370° C. over a 5 hour period.

EXAMPLES 2-5

Hydrotreating

The sulfided catalyst of Example 1 (7.5 cc) was placed in a reactor and used to hydrotreat a dewaxed heavy neutral raffinate. The hydrotreating conditions used are shown in the Table below together with the results obtained.

TABLE

Hydrotreating with Co/Mo/ZSM-39

| | Example No. | | | |
|---|---|---|---|---|
| | 2 | 3 | 4 | 5 |
| Temp. °C. | 260 | 315 | 370 | 370 |
| Pressure, kPa | 10445 | 10445 | 6305 | 10445 |
| LHSV | 0.95 | 0.97 | 1.15 | 1.00 |
| Product: | | | | |
| Yield, 345° C.+, wt. % | 98 | 90 | 100 | 100 |
| Pour Point, °C. | −6 | −4 | −2 | 0 |
| Color, ASTM D-1500-1 | 1 | 1 | 1.25 | 0.5 |
| Viscosity Index | 93 | 95 | 98 | 97 |
| Desulfurization, % | 24 | 37 | 58 | 77 |
| Denitrogenation, % | 24 | 32 | 41 | 49 |

The results shown above are notable in that the yield is good, especially at the 370° C. hydrotreating temperature while the pour point is quite low. Also, the color is good for a charge stock of this nature. The color of the charge prior to hydrotreating is typically about 2.25.

I claim:

1. A process for producing a lubricating oil of improved properties which comprises hydrotreating a lubricating oil base stock in the presence of a hydrotreating catalyst comprising zeolite ZSM-39.

2. A process according to claim 1 in which the hydrotreating catalyst comprises zeolite ZSM-39 and a hydrogenation component comprising a metal component of Group VIB, VIIB or VIII.

3. A process according to claim 2 in which the metal component is selected from nickel, cobalt, molybdenum, tungsten or combinations thereof.

4. A process according to claim 1 in which the lubricating oil base stock is a dewaxed lubricating oil base stock.

5. A process according to claim 4 in which the lubricating oil base stock is a dewaxed, solvent-extracted lubricating oil base stock.

6. A process according to claim 1 in which the lubricating oil base stock is hydrotreated at a temperature of from 200° to 600° C., a pressure of at least 300 kPa and a space velocity of 0.1 to 20.

* * * * *

UNITED STATES PATENT AND TRADEMARK OFFICE
CERTIFICATE OF CORRECTION

PATENT NO. : 4,395,327

DATED : July 26, 1983

INVENTOR(S) : Bruce P. Pelrine

It is certified that error appears in the above—identified patent and that said Letters Patent is hereby corrected as shown below:

Column 6, line 23, delete "300 kPa" and insert --3000 kPa--.

Signed and Sealed this

Twenty-ninth Day of November 1983

[SEAL]

Attest:

GERALD J. MOSSINGHOFF

Attesting Officer

Commissioner of Patents and Trademarks